INVENTOR

*HORACE L. SMITH, JR.*
*JOSEPH M. GIRONE*
*GEORGE B. VOGELEER*
*WILLIAM R. PETTIGREW*

BY *Strauch, Nolan & Neale*

ATTORNEYS

Aug. 9, 1966 H. L. SMITH, JR., ETAL 3,265,862

TYPE FORM HEATER APPARATUS

Filed Dec. 14, 1964 14 Sheets-Sheet 2

INVENTOR
HORACE L. SMITH, JR.
JOSEPH M. GIRONE
GEORGE B. VOGELEER
WILLIAM R. PETTIGREW

BY

Strauch, Nolan & Neale
ATTORNEYS

INVENTOR
HORACE L. SMITH, JR.
JOSEPH M. GIRONE
GEORGE B. VOGELEER
WILLIAM R. PETTIGREW

BY Strauch, Nolan & Neale
ATTORNEYS

TYPE FORM HEATER APPARATUS

Filed Dec. 14, 1964

INVENTOR
HORACE L. SMITH, JR.
JOSEPH M. GIRONE
GEORGE B. VOGELEER
WILLIAM R. PETTIGREW
BY
Strauch, Nolan & Neale
ATTORNEYS Aug. 9, 1966 H. L. SMITH, JR., ET AL 3,265,862

TYPE FORM HEATER APPARATUS

Filed Dec. 14, 1964 14 Sheets-Sheet 5

INVENTOR
HORACE L. SMITH, JR.
JOSEPH M. GIRONE
GEORGE B. VOGELEER
WILLIAM R. PETTIGREW

BY Strauch, Nolan & Neale

ATTORNEYS

Aug. 9, 1966 H. L. SMITH, JR., ETAL 3,265,862

TYPE FORM HEATER APPARATUS

Filed Dec. 14, 1964 14 Sheets-Sheet 6

INVENTOR
HORACE L. SMITH, JR.
JOSEPH M. GIRONE
GEORGE B. VOGELEER
WILLIAM R. PETTIGREW

BY Strauch, Nolan & Neale
ATTORNEYS

Aug. 9, 1966 H. L. SMITH, JR., ETAL 3,265,862
TYPE FORM HEATER APPARATUS
Filed Dec. 14, 1964 14 Sheets-Sheet 7

INVENTOR
HORACE L. SMITH, JR.
JOSEPH M. GIRONE
GEORGE B. VOGELEER
WILLIAM R. PETTIGREW
BY
Strauch, Nolan & Neale
ATTORNEY INVENTOR
HORACE L. SMITH, JR.
JOSEPH M. GIRONE
GEORGE B. VOGELEER
WILLIAM R. PETTIGREW BY Strauch, Nolan & Neale
ATTORNEYS INVENTOR
HORACE L. SMITH, JR.
JOSEPH M. GIRONE
GEORGE B. VOGELEER
WILLIAM R. PETTIGREW BY Strauch, Nolan & Neale
ATTORNEYS

TYPE FORM HEATER APPARATUS

Filed Dec. 14, 1964 14 Sheets-Sheet 10

INVENTOR
HORACE L. SMITH, JR.
JOSEPH M. GIRONE
GEORGE B. VOGELEER
WILLIAM R. PETTIGREW

BY Strauch, Nolan & Neale
ATTORNEYS

INVENTOR
HORACE L. SMITH, JR.
JOSEPH M. GIRONE
GEORGE B. VOGELEER
WILLIAM R. PETTIGREW
BY
Strauch, Nolan & Neale
ATTORNEYS INVENTOR
HORACE L. SMITH, JR.
JOSEPH M. GIRONE
GEORGE B. VOGELEER
WILLIAM R. PETTIGREW
BY
Strauch, Nolan & Neale
ATTORNEYS INVENTOR
HORACE L. SMITH, JR.
JOSEPH M. GIRONE
GEORGE B. VOGELEER
WILLIAM R. PETTIGREW

BY

Strauch, Nolan & Neale
ATTORNEYS

Aug. 9, 1966 H. L. SMITH, JR., ETAL 3,265,862

TYPE FORM HEATER APPARATUS

Filed Dec. 14, 1964 14 Sheets-Sheet 14

INVENTOR
HORACE L. SMITH, JR.
JOSEPH M. GIRONE
GEORGE B. VOGELEER
WILLIAM R. PETTIGREW

BY

Strauch, Nolan & Neale
ATTORNEYS 3,265,862

TYPE FORM HEATER APPARATUS

Horace L. Smith, Jr., and Joseph M. Girone, Richmond, George B. Vogeleer, Hopewell, and William R. Pettigrew, Richmond, Va., assignors to Hupp Corporation, Cleveland, Ohio, a corporation of Virginia Filed Dec. 14, 1964, Ser. No. 417,861
17 Claims. (Cl. 219—405)

This invention relates to heating apparatus and, more specifically, to novel type form heaters for use in the preparation of printing plates for offset presses and to novel radiant heating units for type form heaters and other types of heating apparatus.

In a recently developed method of producing plates for offset presses, the type is set and locked in a form as in the conventional process. Instead of then proofing the type, however, the type is heated to a temperature of, for example, 290–300° F. The heated type is positioned on the bed of a proof press; and a sheet of specially coated film is set on the press cylinder. As the film moves over the hot type form, the coating is vaporized, producing a negative or positive film which can be used to prepare offset plates in the same manner as in the conventional photographic process. The process just described has the advantage that it completely eliminates the photographing, developing, and drying steps of the conventional photographic process and the attendant equipment, expense, loss of time, etc.

It is one important object of the present unit to provide a novel heating unit for heating the type in the process of preparing offset plates just described.

Basically, the heating units of the present invention consist of a cabinet housing an extendable heat resistant tray on which the type forms are placed, a heating unit including an array of quartz tube infrared lamps for heating the type, and a lamp control unit including a novel thermal switch assembly capable of accurately controlling the temperature to which the type form is heated by shutting off the quartz lamps when the type form reaches the desired temperature.

The only other apparatus heretofore known for heating the type forms in the process described above is, in contrast to the simple inexpensive heating apparatus of the present invention, a complex system consisting of a gas-fired flame impingement unit and a steam table for preheating the type form. Moreover, the present invention does not require installation of a gas supply line and a steam generator for the steam table like the prior art system, the only utility required being an electrical power supply, which is normally available in any pressroom. In addition, the present invention is capable of more accurately controlling the temperature to which the type is heated and is safer to use because of the incorporation of novel safety interlocks in the control system and because the outside of the cabinet remains substantially at room temperature. Another important advantage of the present invention is that it is capable of heating the type from room temperature to the minimum required 290° F. temperature in approximatel two minutes in contrast to the prior art system described above in which the form is first preheated in the steam table and then heated for an additional four to five minutes in the gas-fired heater.

Further advantages of the present invention are that, in contrast to the permanently installed prior art system, it can be rolled from one place to another and readily raised and lowered, permitting its tray to be quickly adjusted to the height of the bed of the proof press with which it is to be used so that the heated type form can be slid directly from the heating unit onto the bed of the press.

From the foregoing, it will be apparent that additional objects of the present invention are the provision of novel type form heaters which:

(1) Are simple and inexpensive to manufacture and to maintain;

(2) In conjunction with the preceding object, have readily accessible internal components;

(3) Do not require the installation of gas or steam or other utilities, but operate solely on electrical energy;

(4) Are capable of more accurately controlling the temperature to which the type form is heated than prior art systems;

(5) Are capable of heating the type form to the required temperature faster than prior art apparatus;

(6) Are easily moved from one location to another, can be locked against movement at the desired location, and are readily adjusted in height to match the beds of proof presses with which they are employed.

As discussed above, the novel type form heaters disclosed herein employ quartz lamp heating units. Another important aspect of the present invention is the incorporation in these units of novel features which are adaptable to infrared lamp heating units in general and not restricted in usefulness to type form heaters.

One of these features is a novel alternate lamp terminal and reflector cooling system for the radiant heating unit. In the preferred embodiment of the present invention the planar array of infrared lamps is surrounded by gold-plated top and side reflectors to direct the radiant energy emitted from the lamps onto the type form. An exhaust fan located above the reflector draws air in through vents in the heater cabinet, across the lamp terminals, and across the back of the reflector to prevent the lamp terminals and top reflector from being overheated. For most applications of the type form heaters disclosed herein, this cooling arrangement is adequate. However, in some type form heater applications and in the use of infrared lamp heating units for other purposes, more efficient cooling of the top reflector may be desirable.

Another important object of the present invention is therefore the provision of novel improved cooling systems for the reflectors and lamp terminals of infrared lamp heating units.

The novel improved reflector cooling system of the present invention may employ an exhaust fan to draw cooling air across the back of the reflector like reflector cooling system of the type form heater disclosed herein, although circulation of air by natural convection may also be utilized; and, like the latter, it employs a highly reflective coating, such as gold plating, on the side facing the heat source to maximize the amount of radiant energy on the object to be heated and minimize the absorption of heat by the reflector.

However, in the improved reflector cooling system, a highly emissive coating is applied to the opposite or back side of the reflector to be cooled; and a series of inclined baffles or a sheet of apertured metal is arranged adjacent the reflector in the path of the air circulated across the back of the reflector. The radiant energy absorbed by the reflector is reradiated from its emissive coating to the baffles or apertured sheet, which act as a heat sink. Heat is continuously dissipated from the heat sink by the circulation of cooling air. This system is highly efficient and is capable of maintaining reflector temperatures several hundred degrees lower than they would otherwise be.

From the foregoing, it will be apparent that further, more specific objects of this invention include the provision of novel improved reflector cooling systems which:

(1) Are more efficient than those heretofore known;

(2) Are extremely simple;

(3) Employ coatings of materials having diverse heat transfer characteristics to minimize reflector heating;

(4) In conjunction with the preceding object, employ heat sinks independent of but closely adjacent the reflecting components to further minimize reflector heating;

(5) In conjunction with the preceding objects, provide a circulation of air across the heat sink surfaces to remove heat therefrom.

The second of the novel features utilized in the heating units of the type heaters disclosed herein which are generally applicable to infrared lamp and similar radiant heating units is an improved system for mounting the lamps and electrically connecting them to a lamp energizing circuit. Quartz lamps have sealed cylindrical tubes which are flattened at their ends, relatively thin, generally rectangular metal end caps on the flattened tube ends, and leads, known as pigtails, which are connected to the resistance element inside the tube and extend through the sealed ends. In the conventional lamp mounting system, the lamps are supported in end cap engaging brackets; and the pigtails are led to appropriate terminals around which they are wrapped. Installation and replacement of the lamps is an arduous and time-consuming task.

A further important object of the present invention is, therefore, the provision of novel improved systems for facilitating the installation and electrical connection of infrared and similar lamps.

The foregoing object is accomplished, in accord with the principles of this invention, by: (1) modifying conventional lamps by soldering or spot welding the pigtails to the end caps; and (2) providing a novel lamp terminal assembly including a clip into which the end cap can be snapped. In the present invention this clip both supports the lamp and electrically connects its resistance element to a source of energizing current through the end cap and pigtail. This novel arrangement eliminates the need of making separate mechanical and electrical connections and reduces the task of making the mechanical and electrical connections to one of the utmost ease and simplicity.

Connectors have heretofore been designed specifically for lamps of the type to which the present invention relates, one such connector being shown in U.S. Patent No. 2,957,157 issued October 18, 1960 to R. H. Carter for Electrical Terminal Connector. The terminal clip assembly of the present invention, however, has a number of advantages over the Carter device including insulating components which are of much simpler configuration and, consequently, much less expensive to manufacture. Another important advantage of the terminal clip assembly of the present invention is that lamps are much more easily removed and installed than in Carter's arrangement as the latter has separate electrical and mechanical connections like other more conventional prior art arrangements.

Consequently, further specific objects of the present invention include the provision of novel terminal clip assemblies for quartz tube and similar lamps which, in comparison to those heretofore known:

(1) Are simpler and less expensive to manufacture;

(2) Materially reduce lamp installation and replacement time;

(3) Have a single component which both supports the lamp and electrically connects it to the lamp-operating circuit.

Another important feature of the present invention is a novel adjustable reflector assembly. The advantages of this arrangement are that different sizes of heating units can be used with a single reflector; and, further, the reflector assembly can be adjusted to provide even heat distribution across different sizes of type forms or other objects.

Accordingly, a further important object of this invention is the provision of novel improved reflector assemblies having the advantages described in the preceding paragraph.

Other objects, further novel features, and additional advantages of the present invention will become more fully apparent from the appended claims and as the ensuing detailed discussion and description proceeds in conjunction with the accompanying drawing, in which:

Figures 1, 2:
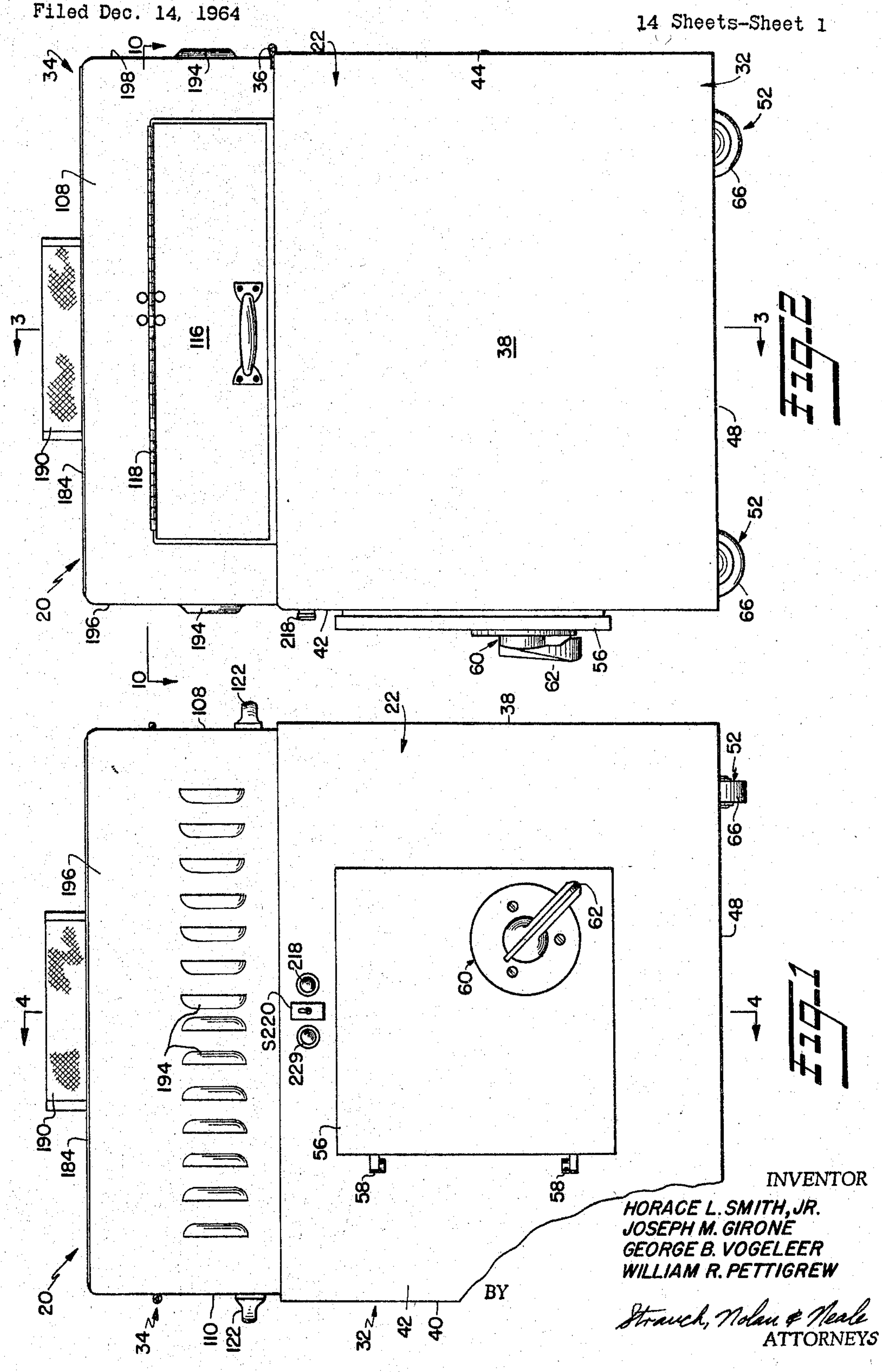
FIGURE 1 is a front view of a type form heater constructed in accord with the principles of the present invention.
FIGURE 2 is a side view of the type form heater.

Referring now to the drawing, FIGURES 1–4 depict a type form heater 20 constructed in accord with the principles of the present invention and including, generally, a cabinet 22 housing a type form supporting tray 24 which is movable into and out of the cabinet, a radiant heating unit 26 for heating the type form on tray 24, an exhaust fan or blower 28 for preventing overheating of various heating unit components, and a control system 30 (see FIGURE 20) for controlling the operation of heating unit 26 and exhaust fan 28.

Type form heater cabinet 22 includes a lower or bottom section 32 and an upper or top section 34 pivotally connected by a piano-type hinge 36. Lower section 32 is of generally boxlike configuration and of sheet metal construction and has side walls 38 and 40 (FIGURES 2 and 4), front and rear walls 42 and 44, top wall 46, and a flange 48 around the bottom.

Lower cabinet section 32 houses an electrical panel 50, on which several components of control system 30 are mounted, and four casters 52, which facilitate the movement and positioning of type form heater 20. Electrical panel 50, which is of generally U-shaped configuration, is of sheet metal construction and has flanges 53 (see FIGURE 3) bolted to the front wall 42 of lower cabinet section 32. Access to panel 50 is gained through an opening 54 in the lower cabinet section front wall 42 which is normally covered by a door 56 fixed to cabinet section front wall 42 by hinges 58. A circuit breaker 60 with an operating handle 62 is fixed to door 56. Suitable circuit breakers are commercially available and any of these may be employed, the particular type of circuit breaker not being critical in the practice of the present invention.

Fixed to top wall 46 of lower cabinet section 32 above electrical panel 50 is an inclined sheet metal shield 64, through which the leads connecting the panel-mounted heater controls to radiant heating unit 26 extend.

Figure 4:
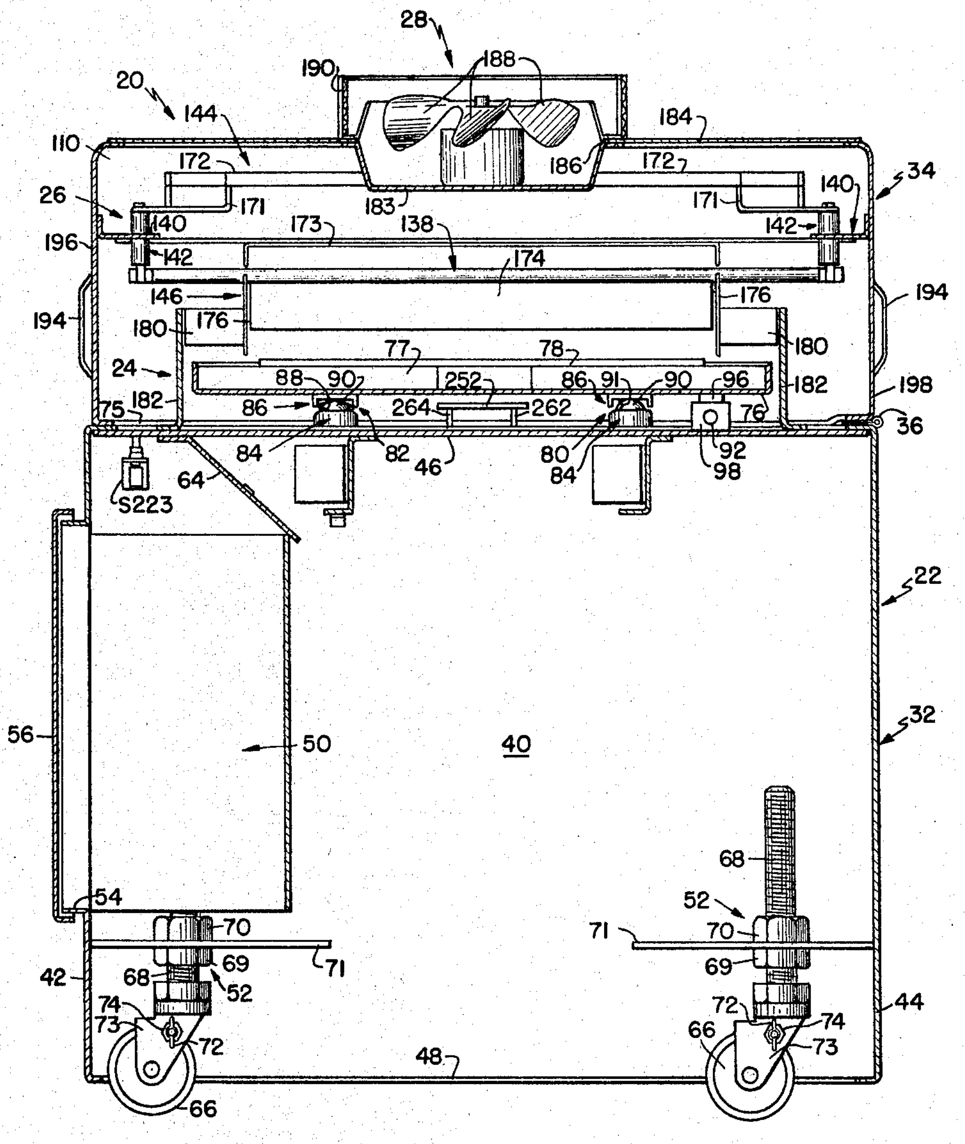
FIGURE 4 is a section through the type form heater, taken substantially along line 4—4 of FIGURE 1.

Casters 52 each include a caster wheel 66 fixed to a threaded stem or shaft 68 and nuts 69 and 70 threaded on shaft 68. As shown in FIGURE 4, each of the support shafts 68 extends vertically through a horizontally disposed, sheet metal support 71 fixed to a side and rear (or front) wall of cabinet section 32. Nuts 69 and 70 are disposed on opposite sides of the sheet metal support (to which nut 69 is welded) and clamp the support between them. By rotating nut 70 on shaft 68, caster wheel 66 can be raised and lowered relative to cabinet 22. This greatly increases the usefulness of type form heater 20 as it permits it to be raised and lowered so that tray 24 will be at exactly the same height as the bed of the proof press with which it is to be associated, facilitating the transfer of heated type forms from heater 20 to the proof press. Also, casters 52 facilitate the leveling of the type form heater and can be adjusted to compensate for irregularities in the floor on which it is supported, etc.

Each caster 52 includes a thumbscrew 72 extending through its wheel supporting bracket 73 and threaded through a nut 74 welded to the bracket. After the type form heater is moved to the desired location, thumbscrews 72 are tightened against wheels 66, locking the type form heater in place.

The hinged top section 34 of cabinet 22, which rests on lower section 32, houses type form supporting tray 24, radiant heating unit 26, and exhaust fan or blower 28. Top section 34 is, like lower section 32, of sheet metal construction and has a boxlike configuration with an open lower side 75.

The type form supporting tray assembly 24 housed in upper cabinet section 34 includes a rimmed sheet metal tray 76 supporting a slab or strips of Marinite or equivalent insulating material 77 on which a type form supporting slab 78 is positioned. The type form supporting slab 78 is preferably made of a material which is heat resistant and has a low coefficient of friction as this permits the type form to be readily slid onto and off of tray assembly 24. Suitable materials are Colorlith and Asbestolite, both of which are manufactured by the Johns-Manville Corporation. Other equivalent materials may be used, if desired.

Tray assembly 24 is movably supported on the top wall 46 of lower cabinet section 32 by a pair of support assemblies 80 and 82. Support assemblies 80 and 82 each include four ball transfer elements 84 (such as Mathews Conveyors-Ball Transfer Type 101), fixed to lower cabinet section top wall 46. Support assembly 82 also includes an elongated rail 86, fixed to the bottom side of tray 76. Guide rail 86 has a V-sectioned configuration providing a groove 88 into which the ball transfers 84 extend. The cooperation between grooves 88 and balls 90 of the transfer elements insures that tray assembly 24 travels in a straight line as it is pushed into and pulled out of top cabinet section 34.

Support assembly 80 has a guide rail with a groove 91 substantially wider than balls 90. Groove 91 accommodates expansion of tray assembly 24 and misalignment of the components of support assemblies 82 and 80.

Figure 5:
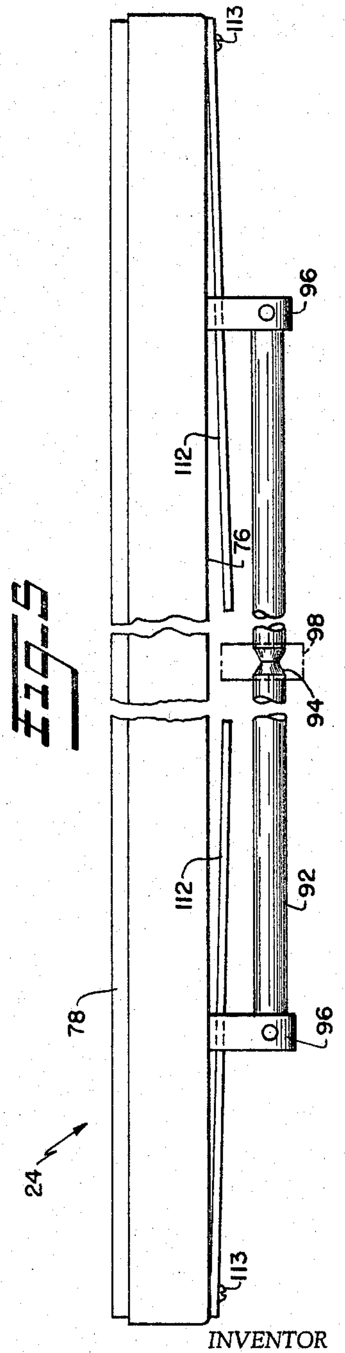
FIGURE 5 is a side view of the tray assembly and a tray assembly guiding and positioning arrangement employed in the type form heater of FIGURE 1.

As shown in FIGURE 5, an elongated rod 92 with an annular, V-sectioned groove 94 at its midpoint is fixed to the bottom of tray 76 by tray-mounted brackets 96. Rod 92 extends through a bracket or catch 98 fixed to the upper wall 46 of lower cabinet section 32. Inside catch 98 is a steel ball 100 separated from the catch by a compression spring 102. When tray assembly 24 is pushed into upper cabinet section 34, rod 92 slides through catch 98 until ball 100 is biased by spring 102 into the groove 94 in rod 92, positioning tray assembly 24 centrally of the upper cabinet section. When force is exerted on tray assembly 24 to move it out of upper cabinet section 34, ball 100 rides up out of groove 94 to permit movement of the tray assembly.

Figure 3:
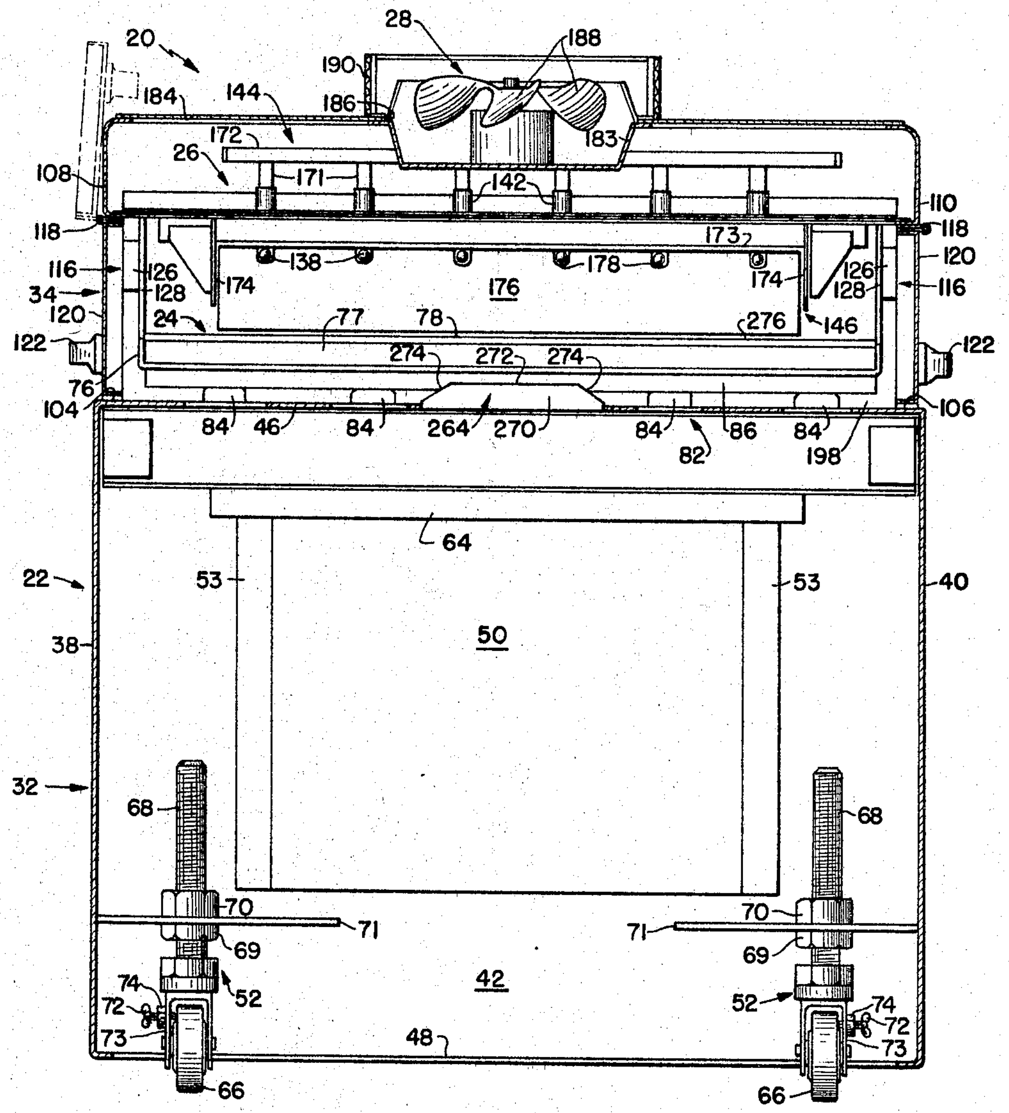
FIGURE 3 is a section through the type form heater, taken substantially along line 3—3 of FIGURE 2.

Referring now to FIGURE 3, tray assembly 24 may be partially moved out of upper cabinet section 34 through either of two apertures 104 and 106 in the two side walls 108 and 110 of upper cabinet section 34.

Figure 7:
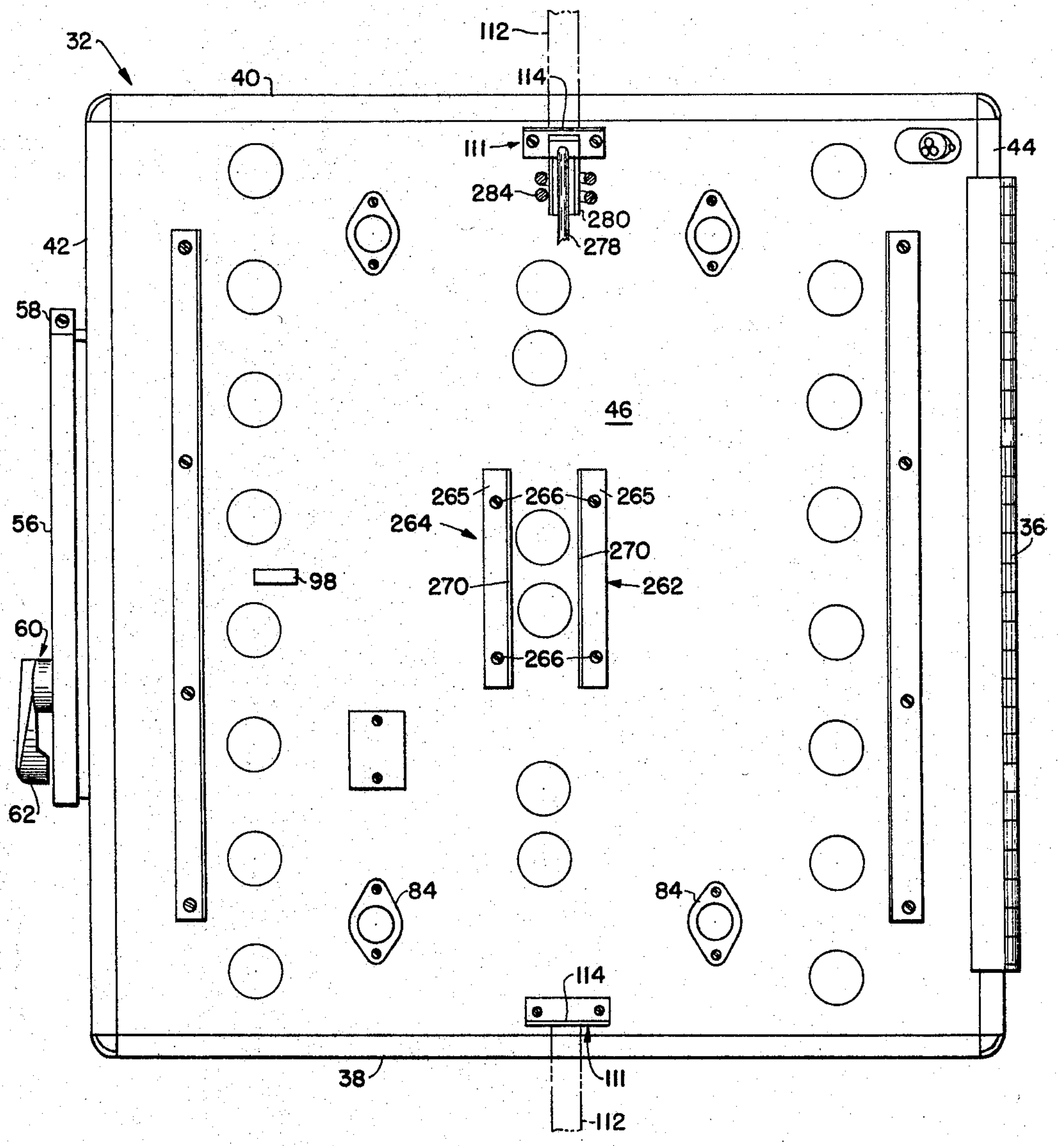
FIGURE 7 is a plan view of the lower section of the type form heater of FIGURE 1.
Figure 6:
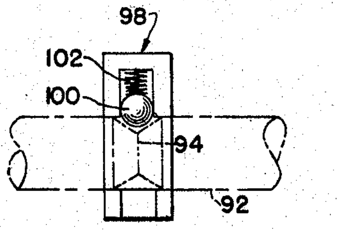
FIGURE 6 is a fragmentary and partially sectioned portion of FIGURE 5 to an enlarged scale.

When tray assembly 24 is pulled out of upper cabinet section 34, it is locked against movement back into the cabinet by one of two lock assemblies, each of which consists of an angle iron type stop 111 fixed to the top wall 46 of lower cabinet section 32 and a strap 112 loosely fixed by a screw 113 to the bottom of tray 76 to provide freedom of movement between the strap and tray. When tray assembly 24 is extended from upper cabinet section 34, strap 112 drops down over the vertical flange 114 of angle 111, shown in phantom lines in FIGURE 7. This locks tray assembly 24 against movement back into upper cabinet section 34. When the operator of the type form heater is ready to push the tray assembly back into the cabinet, he merely presses strap 112 upwardly until it clears angle flange 114, unlocking the tray assembly for movement back into the cabinet. The foregoing is an important practical feature of the present invention, since it prevents inadvertent inward motion of the tray assembly while the operator is positioning a type form on slab 78.

The apertures 104 and 106 in the side walls of upper cabinet section 34, through which tray assembly 24 is extended, are normally closed by doors 116 pivotably mounted by hinges 118 to the associated top cabinet section side wall 108 or 110. Doors 116 each consist of a sheet metal housing 120 to the exterior of which a pull type handle 122 is fixed. On the opposite side of each door 116 from the handle is a sheet metal spacer 126 to which a sheet metal heat shield 128 is fastened in parallel, spaced relation to the door.

Figure 9:
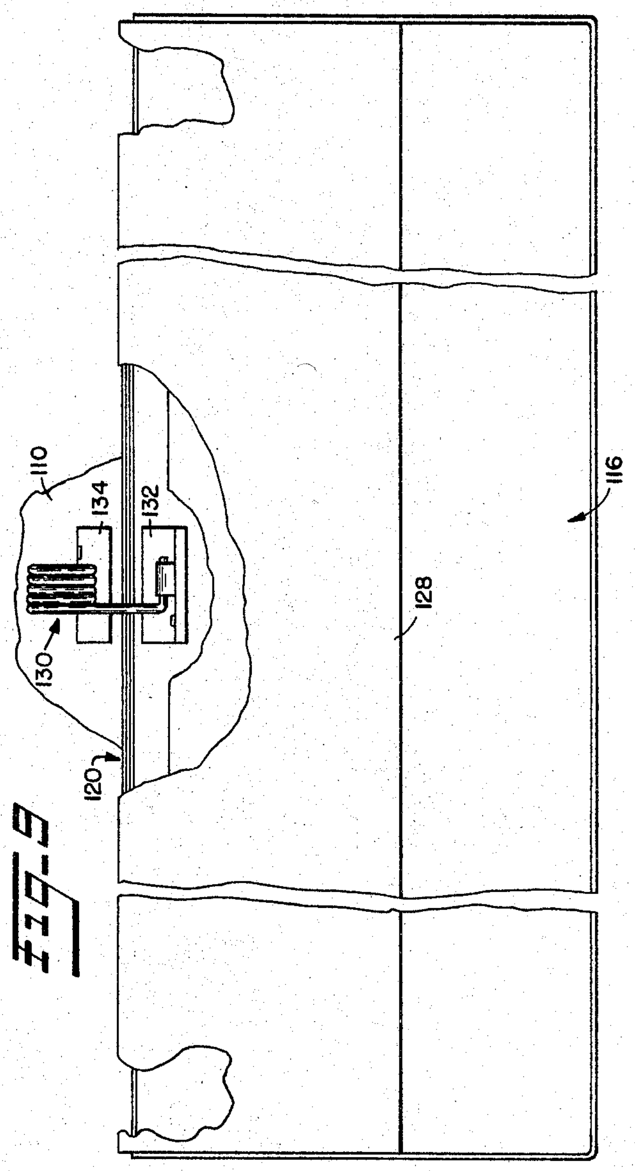
FIGURE 9 is a plan view of the door and an adjacent portion of the upper cabinet section.
Figure 8:
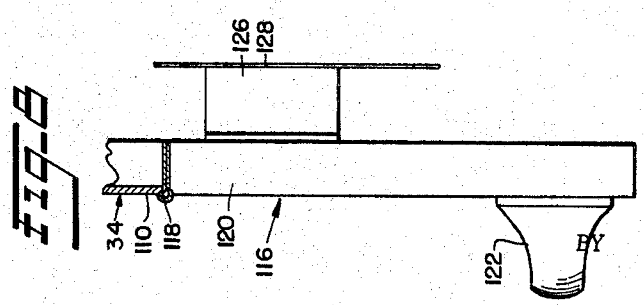
FIGURE 8 is a side view of a door in the upper section of the type form heater of FIGURE 1.

Referring now to FIGURE 9, doors 116 are retained in their normally closed position (shown in full lines in FIGURE 3) and in their open elevated position (shown in phantom lines in FIGURE 3) by coil spring type door retainers 130 fixed, at their opposite ends, to brackets 132 and 134. The foregoing brackets are attached, respectively, to the interior of each door 116 and the associated upper cabinet section side wall 108 or 110. Any suitable door retainer of this type may be employed. A typical example is the Southco #23.

Figure 10:
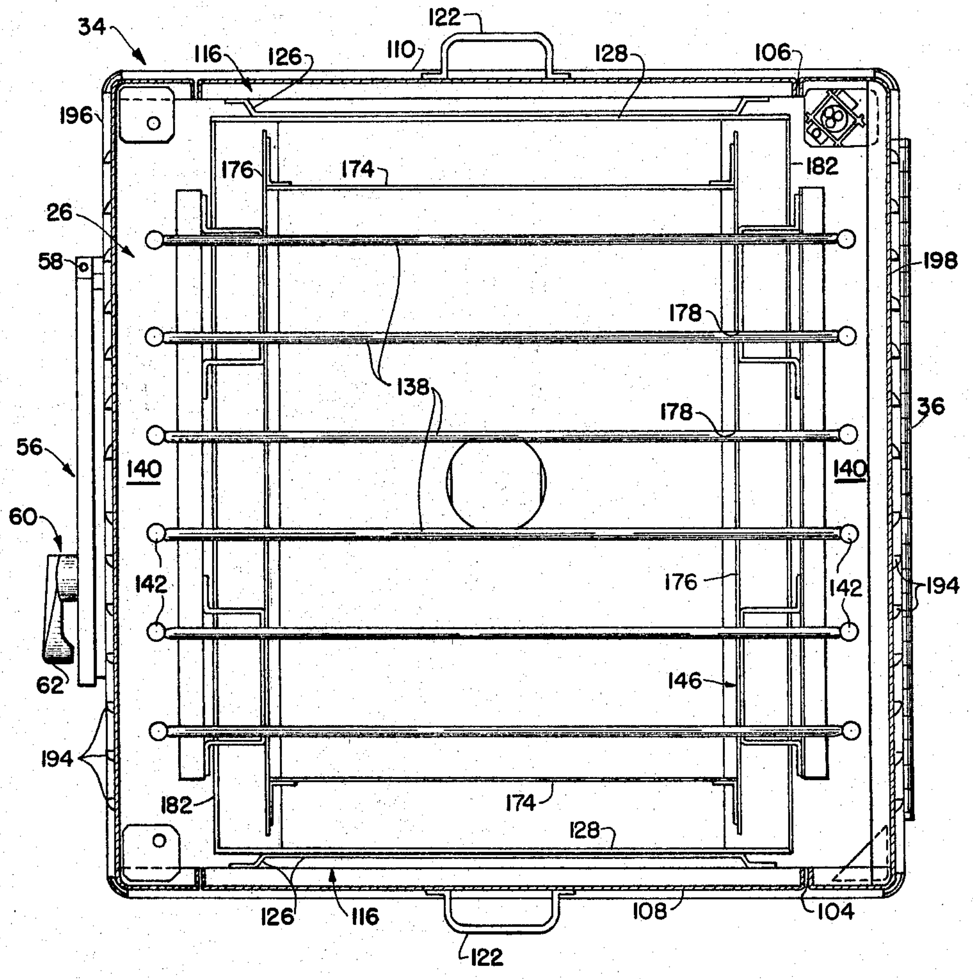
FIGURE 10 is a horizontal section through the upper section of the type form heater, taken substantially along line 10—10 of FIGURE 2.

Referring now to FIGURES 3, 4, and 10, infrared lamp heating unit 26 includes a plurality of quartz tube type infrared lamps 138 supported in parallel, spaced apart, side-by-side relationship from structural members identified generally by reference character 140 by end clamp assemblies 142. Unit 26 also includes a bus bar assembly 144 for connecting lamps 138 to a source of operating voltage and a reflector assembly 146 for directing the infrared radiation emitted from lamps 138 onto the type form or other object or objects on the slab 78 of tray assembly 24.

The quartz tube infrared lamps 138 may be of any desired brand. Such lamps include a resistance heating element (not shown) housed in an elongated, sealed quartz tube 148. Metal end caps 150 cover the flattened ends of tube 148. Lamps 138 are conventionally mounted by inserting end caps 150 in suitable lamp mounts, the end caps protecting the quartz tube ends from damage. The lamp's resistance element is then connected to a source of operating voltage by pigtails 152 which extend from the interior of the lamp through its sealed ends.

In the present invention, pigtails 152 are cut, folded back, and spot welded or soldered to end caps 150, providing a conductive path from the lamp resistance heating element through the pigtail to the end cap.

The novel modified quartz lamps 138 are removably supported from structural members 140 by the end clamp assemblies 142 mentioned briefly above.

Figure 14:
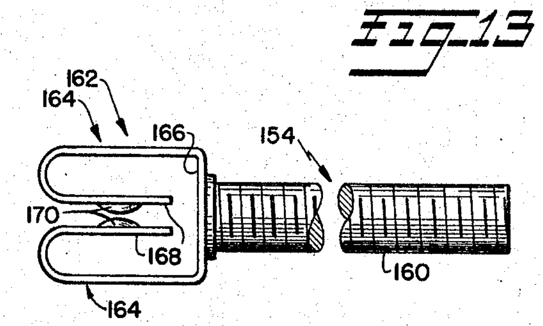
FIGURE 14 is a side view of a component employed in the clip assembly of FIGURE 11.
Figure 15:
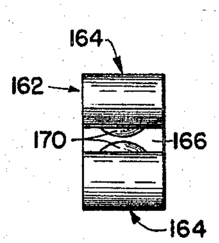
FIGURE 15 is an end view of the component of FIGURE 14.

Referring now to FIGURES 11, 12, 14, and 15, each of the end clamp assemblies 142 includes a clip assembly 154, cylindrically configured insulators 156, and a nut 158. As best shown in FIGURES 14 and 15, clip assembly 154 consists of two components, a threaded stud 160 and a lamp supporting spring clip 162. Clip 162 is formed from a strip of conductive metal into the C-shaped configuration illustrated in FIGURE 14, providing parallel, spaced apart legs 164 connected by a web 166 spot welded or otherwise fastened to one end of stud 160.

Figure 12:
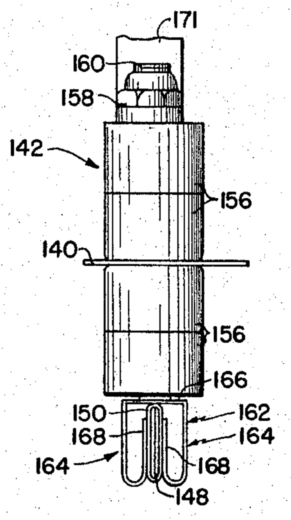
FIGURE 12 is a front view of the terminal clip assembly, infrared lamp, bus bar, and structural member of FIGURE 11, taken substantially along line 12—12 of the latter figure.

The legs 164 are bent into a U-shaped configuration, providing parallel, spaced apart leg portions 168 adapted to engage opposite sides of a lamp end cap 150, as shown in FIGURE 12. Dimples 170 are punched or otherwise formed in clip assembly leg portions 168 to assist in retaining end caps 150 in place and to accommodate misalignment of the two end caps 150.

Figure 11:
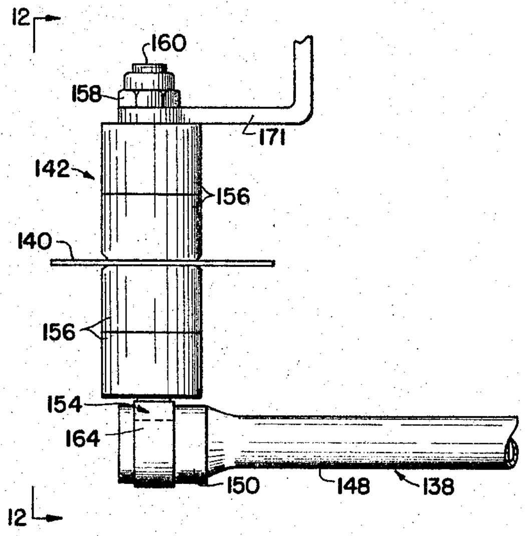
FIGURE 11 is a side view of a novel terminal clip assembly employed in the type form heater of FIGURE 1 to mechanically support the infrared lamps employed therein and to make the electrical connections to the lamps, a portion of one of the lamps, a fragment of the structural member on which the lamp is mounted, and a fragment of a bus bar by which the lamp is connected to its power source.
Figure 13:
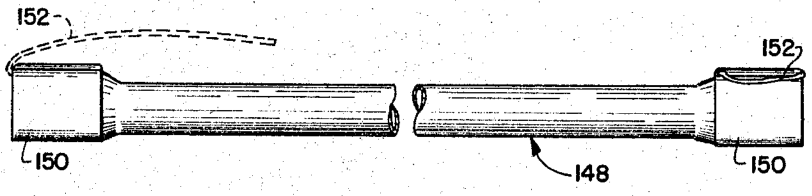
FIGURE 13 is a side view of an infrared lamp, showing the manner in which it is modified for use with the terminal clip assembly of FIGURE 11.

Referring now to FIGURES 4 and 11, infrared lamps 138 are installed in radiant heating unit 26 by inserting their end caps 150 between the leg portions 168 of end clamp assemblies 142. The inherent resilience in the legs of the end clip assembly presses the dimples 170 against opposite sides of end caps 150, thereby retaining them in place.

The studs 160 of the clip assemblies 154 extend through structural members 140 to which they are attached by nuts 158. Two insulators 156 are journalled on studs 160 on each side of the associated member 140 to electrically isolate heater cabinet 22 from lamps 138 and from bus bar assembly 144, which includes a bus bar 171 journalled on each end clip assembly shaft 160 and clamped against the uppermost insulator 156 by nut 158.

In the foregoing arrangement the resistance element of each lamp 138 is connected through pigtails 152, end caps 150, and clip assembly 154 to bus bar assembly 144 which, in turn, is connected to the source of operating voltage. Thus, the novel end clip assemblies 142 just described combine both a mechanical support for the infrared lamps and an electrical connection to their resistance heating elements in a single component. This arrangement is of substantial importance in the practice of the present invention and is a decided improvement over the mounting and electrical connection arrangements for such lamps heretofore known in that it materially facilitates the installation, removal, and replacement of lamps 138.

As discussed previously, the novel combination of modified quartz lamps 138 and end clamp assembly 142 just described is not limited in application to type form heaters, but may be employed in many applications of quartz tube and similar heaters. In such other applications it will, of course, have the same advantages as in type form heaters; viz., lower manufacturing cost and provision of a material reduction in lamp installation and replacement time.

The bus bar assembly 144 of radiant heater assembly 26 includes the just-described bus bars 171 and, in addition, bus bars 172 to which bus bars 171 are connected. Bus bars 171 and 172, which are preferably made from a highly conductive metal such as copper, or aluminum, may be bent into any desired configuration dictated by available space requirements and may be electrically connected as desired, depending upon the operating voltage to be supplied to the quartz lamp and the voltage of the available power source. As the details of the configuration of and the various electrical connections among bus bars 171 and 172 are not critical in the practice of the present invention, it is not believed necessary to describe them in greater detail herein.

To concentrate the infrared energy emanating from quartz lamps 138 onto the type form or other object or objects on tray assembly 24, reflector assembly 146 is employed, as mentioned briefly above. Referring now to FIGURES 3, 4, and 10, reflector assembly 146 includes a top reflector 173, side reflectors 174, and end reflectors 176. Reflectors 173, 174, and 176, which may be formed from sheet steel or other sheet material, are joined into a boxlike structure with an open lower end. The two end reflectors 176 are provided with apertures 178 through which the quartz lamps 138 extend, as shown in FIGURES 4 and 10.

The inside surfaces of reflectors 173, 174, and 176 are preferably coated with gold to provide minimum absorptivity and maximum reflectivity, thereby minimizing the proportion of the radiant energy absorbed by the reflectors and maximizing the amount transmitted to the object or objects on tray assembly 24. Other coatings may, of course, be substituted for gold to minimize heat absorption by the reflectors although gold is preferred because of its highly desirable heat transfer characteristics.

Fixed to end reflectors 176 by hat-shaped brackets 180 (see FIGURE 10) are L-shaped heat shields 182 (see FIGURE 4), which are adapted to engage the upper wall 46 of lower cabinet section 32 when the upper cabinet section 34 is closed. Heat shields 182 cooperate with the previously described heat shields 128 to thermally isolate the exposed walls of the heater cabinet and thereby maintain the latter at a sufficiently low temperature that they will not burn or cause discomfort to the operator (in the preferred embodiment of the present invention, the cabinet reaches a maximum temperature of 110–115° F.).

As mentioned previously, a fan 28 is employed to prevent overheating of the terminals of quartz lamps 138 and reflector assembly 146. As is best shown in FIGURES 3 and 4, exhaust fan 28 is fixed by support 183 to the top wall 184 of heater upper cabinet section 34 with a centrally located aperture 186 providing communication between the interior and exterior of upper cabinet section 34. To protect the operator from injury by the rotating blades 188 of fan 28, a square protective grill 190 is employed. Grill 190 is fixed, as by screws, to the exterior of upper cabinet section top wall 184.

Cooling air is drawn by fan 28 through louvers 194 formed in the front and rear walls 196 and 198 of upper cabinet section 34 into its interior. The cooling air flows across the end portions of infrared lamps 138 and the reflectors of reflector assembly 146, cooling these components and preventing them from overheating. The heated air is exhausted from the interior of upper cabinet section 34 through aperture 186 and shield 190 by fan 28.

Figure 20:
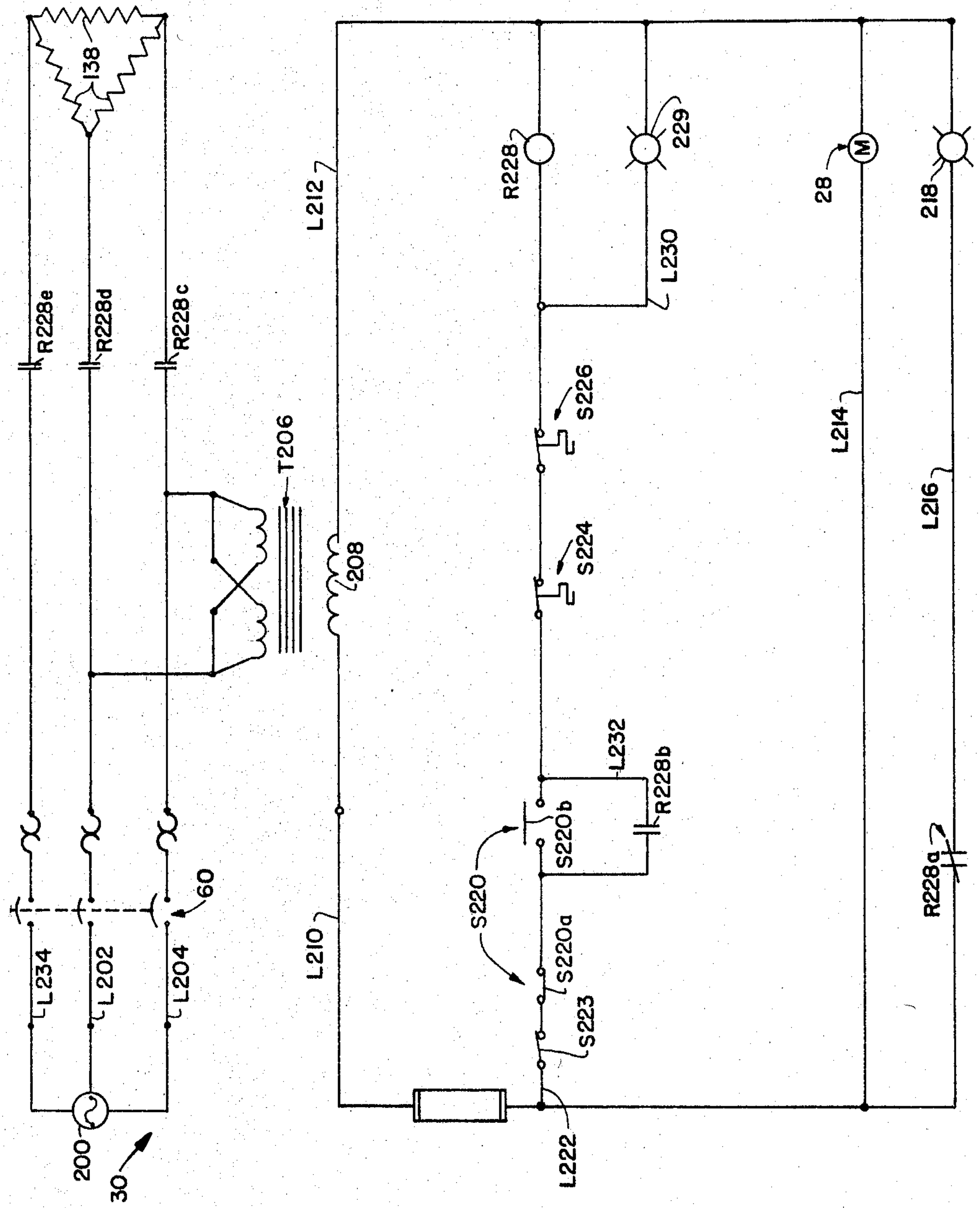
FIGURE 20 is a schematic diagram of the electrical control system employed in the type form heater of FIGURE 1.

Referring now to FIGURE 20, operation of the type form heater 20 just described is initiated by rotating the circuit breaker 60 described previously from the "off" to its "on" position. This completes a circuit from three-phase power source 200 through leads L202 and L204 to the primary winding of a transformer T206 incorporated in heater control system 30. The secondary 208 of transformer T206 is connected through leads L210 and L212 and branch lead L214 to motor M of fan 28 so that closing of circuit breaker 60 energizes: (1) the control circuit 30 for infrared lamps 138; and (2) exhaust fan 28, which operates as long as circuit breaker 60 is closed.

Connected in parallel with the exhaust fan motor in a branch lead L216 extending between leads L210 and L212 is a green signal lamp 218 which is lit at the same time that the fan motor is energized, indicating that the heater is ready to receive the type form or other object or objects to be heated.

After the type form has been positioned on tray assembly 24 and the tray assembly moved to its closed position, operation of infrared lamps 138 is initiated by moving a three position toggle switch S220 to its "up" or "start" position in which the switch contact **S220*a* remains closed and contact S220*b* moves from the open to the closed position, completing a circuit from lead L210 through lead L222, toggle switch contacts S220*a* and S220*b*, normally closed microswitch S223, temperature responsive limit switches S224 and S226, and a contactor coil R228 to lead L212, energizing the relay. Energization of contactor coil R228 causes it to open a normally closed contact R228*a* in the branch lead L216 in which the green ready lamp 218 is wired, causing the green lamp to go out. At the same time a red "heat on" signal lamp 229, wired in a branch lead L230 connected in parallel with the lead L222 in which contactor coil R228 is wired, comes on, indicating that the lamps 138 in radiant heating unit 26** are on.

Energization of contactor coil R228 simultaneously closes a normally open contact **R228*b* in a lead L232 connected around toggle switch contact S220*b*. The operator may then release the toggle switch which will automatically return to its center or "on" position in which contact S220*a* remains closed and contact S220*b* returns to its open position. The holding circuit around the contact S220*b* prevents de-energization of contactor coil R228 when toggle switch S220** is released.

Energization of contactor coil R228 also closes normally open contacts **R228*c*, R228*d*, and R228*e* in the three power leads L202, L204, and L234 connecting lamps 138 to the three-phase power source 200**, energizing the lamps.

Lamps 138 continue to burn and heat the type form on tray assembly 24 until the temperature sensing elements of temperature responsive limit switches S224 and S226 (which are in physical contact with the type form on tray assembly 24) indicate that the type form has reached the predetermined temperature for which the limit switches are set. When this temperature is reached, one (or both) of the limit switches S224 or S226 opens, interrupting the circuit to contactor coil R228, which is de-energized, thereby closing contact **R228*a* and opening contacts R228*b–e***.

This interrupts the circuit to lamps 138 and the holding circuit around toggle switch contact **S220*b*, thereby extinguishing red "heat on" lamp 229, and establishes continuity in lead L216, thereby lighting the green "ready" lamp 218**.

While lamps 138 are normally turned off automatically in the manner just described, they can be extinguished, in an emergency or for any other reason, by moving toggle switch S220 to its down or "stop" position, in which both contacts **S220*a* and S220*b* are opened. This interrupts the continuity of the circuit to coil R228**, causing de-energization of the latter with the results just described.

Referring now to FIGURES 4 and 20, the microswitch S223 wired in series with toggle switch S220 is an important safety feature of the present invention. Specifically, as described above, upper cabinet section 34 of heater 20 is hinged to lower cabinet section 32 so that it can be opened for replacement of lamps 138. Should the upper cabinet section be opened with the lamps energized, serious injury might result to the operator because of the high temperature at which the quartz lamps operate and because they emit an intense white light which is damaging to the eyes. To prevent such an occurrence, microswitch S223 is mounted in lower cabinet section 32 with its actuator positioned to be engaged by upper cabinet section 34 when the latter is closed. This depresses the switch actuator, in which position the switch contacts are closed. Therefore, upper cabinet section 34, when closed, maintains switch S223 closed. However, should the upper cabinet section be opened while lamps 138 are on, the actuator of microswitch S223 will automatically move to its extended position, opening the switch contacts and interrupting the circuit to contactor coil R228. As explained above, this is effective to de-energize infrared lamps 138. Thus, the lamps cannot be energized unless the upper cabinet section 34 is fully closed.

With the exception of circuit breaker 60, microswitch S223, and high temperature limit switches S224 and S226, the electrical components of the control system just described are mounted on the electrical control panel 50 in lower cabinet section 32 behind access door 56. This is an important practical feature of the present invention since it permits ready access to the electrical components and therefore materially simplifies the servicing of heater 20.

As mentioned briefly above, temperature responsive switches S224 and S226 are in contact with the type form on tray assembly 24 and de-energize radiant infrared lamps 138 when the type form reaches the temperature at which the thermal switches are set. Two serially wired switches are preferably employed because of irregularities in the bottom of the type form and because the serially wired switch provides more precise temperature control.

Figures 16, 17, 18:
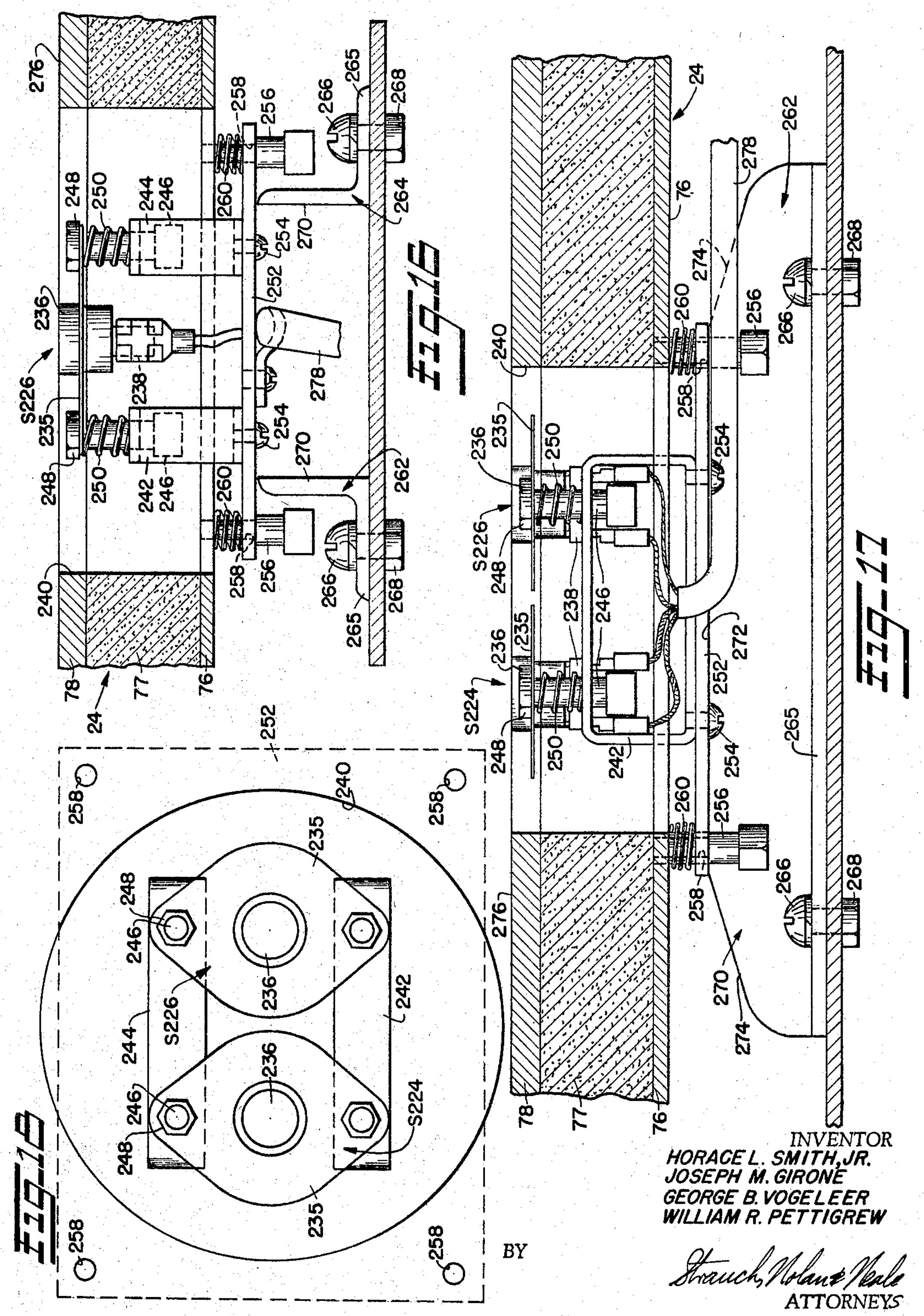
FIGURE 16 is a front view of a thermal switch assembly employed in the type form heater of FIGURE 1 to control the temperature to which the type form is heated and a cam type mechanism provided to automatically position the temperature sensing elements of the thermal switch assembly against the type form.
FIGURE 17 is a side view of the thermal switch assembly and its positioning mechanism.
FIGURE 18 is a top view of the thermal switch assembly.

Referring now to FIGURES 16–18, another novel and important feature of the present invention is a novel arrangement provided in the present invention for automatically elevating the temperature sensitive elements of the microswitches into contact with the type form when tray assembly 24 is moved into the heater cabinet and for automatically lowering the temperature sensing elements when the tray assembly is moved out of the cabinet to permit type forms to be slid onto and off of the tray assembly without damaging the temperature sensing elements.

As shown in the figures just mentioned, switches S224 and S226 have mounting flanges 235, temperature responsive actuating elements 236, and switch bodies 238. Switches S224 and S226 are mounted on tray assembly 24 with the switches extending vertically through a central aperture 240 in the tray assembly. More specifically, the switches are fastened to parallel, generally rectangular switch brackets 242 and 244 by shoulder bolt spacers 246, which extend through switch mounting plates 235, nuts 248 threaded on the upper end of the spacers, and compression springs 250 journalled on shoulder bolts 246 between the switch mounting plates and the switch supporting brackets to bias temperature sensing elements 236 upwardly.

The assembly of temperature responsive switches S224 and S226 and mounting brackets 242 and 244 just described is mounted for vertical movement in tray assembly aperture 240 by a lifting plate 252 to which switch supporting brackets 242 and 244 are fixed by screws 254. Lifting plate 252 is fixed to tray assembly 24 by four bolts 256 which extend through apertures 258 in the lifting plate and are threaded into the tray 76 of tray assembly 24. Compression springs 260, surrounding bolts 256 between the lifting plate and tray 76, bias lifting plate 252 downwardly.

Lifting plate 252 (and, therefore, switches S224 and S226) is automatically raised and lowered as tray assembly 24 is moved in and out of heater cabinet 22 by a pair of cooperating cams 262 and 264 which, in the preferred embodiment of the present invention, are angles having horizontal flanges 265 fixed to the top wall 46 of lower cabinet section 32 by screws 266 and nuts 268. As shown in FIGURES 3 and 16, cams 262 and 264 are aligned in the direction of movement of tray assembly 24 in parallel, spaced apart relationship adjacent opposite edges of lifting plate 252 to maintain the lifting plate level as it moves up and down. The vertical flanges 270 of cams 262 and 264 are tapered at their ends to provide a generally horizontal cam surface 272 disposed between inclined cam surface end portions 274.

When tray assembly 24 is pushed into cabinet 22 and approaches its normal closed position, lifting plate 252 rides up an inclined cam surface end portion 274 of each of the cams, elevating the temperature sensing elements 236 of switches S224 and S226 into contact with the bottom of the type form or other object or objects on tray assembly 24. From inclined cam surface end portions 274, lifting plate 252 rides onto the level central portions 272 of the cams, which retains the thermal switches S224 and S226 in their elevated position while tray assembly 24 is in its closed position, thereby maintaining the temperature sensing elements 236 of the two thermal switches in contact with the type form until the tray assembly 24 is again moved out of cabinet 22. Compression springs 250 bias the temperature sensing elements firmly against the bottom of the type form.

As the tray assembly is moved out of cabinet 22, lifting plate 252 clears the uppermost central cam surface portion 272 and is then moved downwardly by compression springs 260, retracting the temperature sensing elements 236 of thermal switches S224 and S226 below the upper surface 276 of the tray assembly. With temperature sensitive elements 236 retracted in the manner just described, the type form can be slid onto the tray assembly 24 without engaging and possibly damaging the temperature sensing elements 236.

Figure 19:
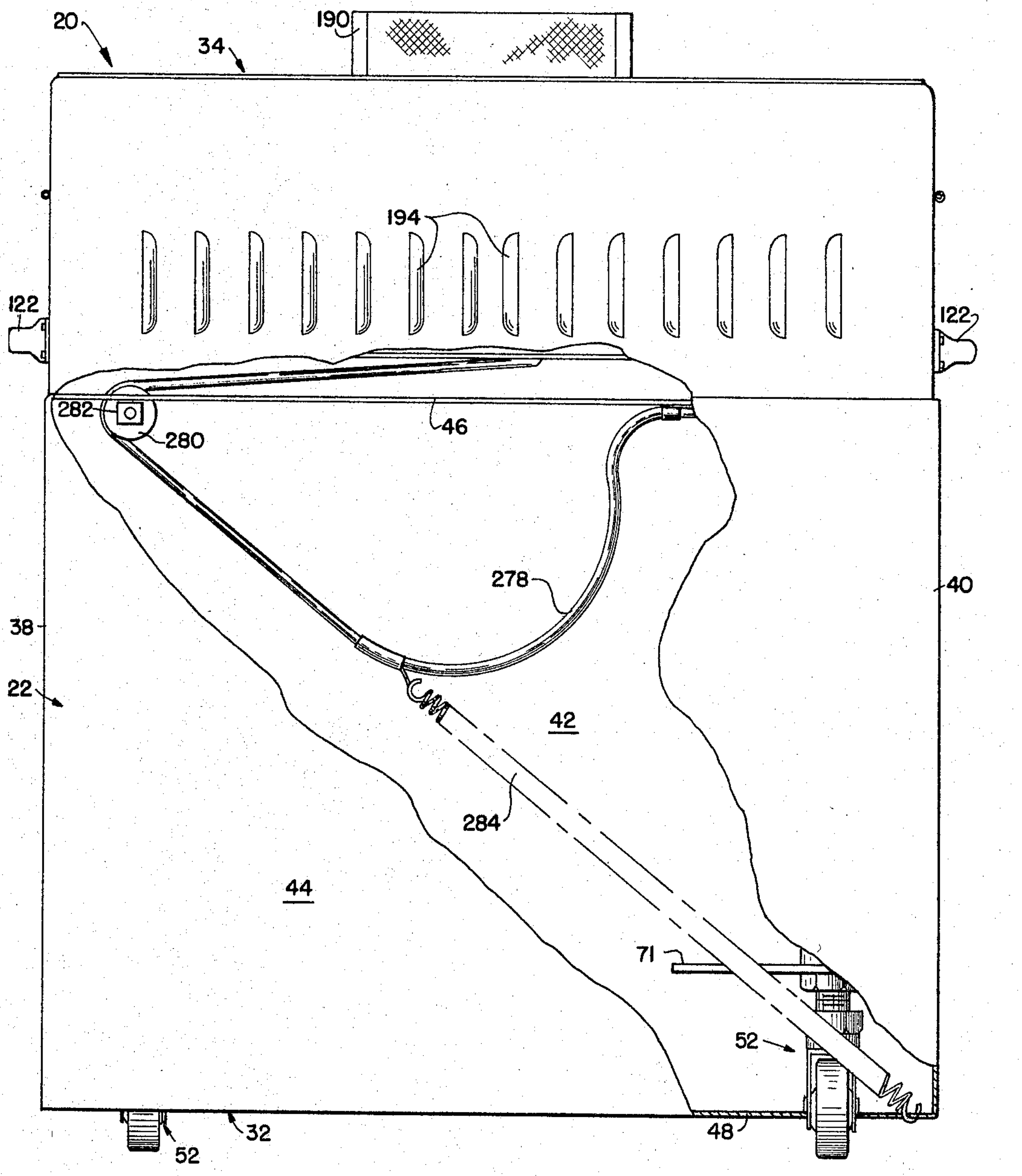
FIGURE 19 is a side view of the type form heater of FIGURE 1 with the cabinet broken away to show a take-up mechanism for the electrical leads connected to the thermal switch assembly.

As shown in FIGURES 16 and 17, the leads to temperature responsive switches S224 and S226 (see FIGURE 20) are bundled together in a cable 278. Referring now to FIGURE 19, cable 278 extends from switches S224 and S226 around a pulley 280 rotatably journalled in brackets 282 fixed to the top wall 46 of lower heater cabinet section 32 and then to the electrical control panel 50 where the leads in the cable are fastened to a terminal block (not shown). Cable 278 is of sufficient length to permit tray assembly 24 to be pulled out of the heater cabinet through either of the two access openings 104 and 106. To automatically take up the slack in cable 278 as tray assembly 24 is moved in and out of cabinet section 34, a tension spring 284 is connected between the cable and the bottom wall 48 of heater cabinet lower section 32.

Figure 21:
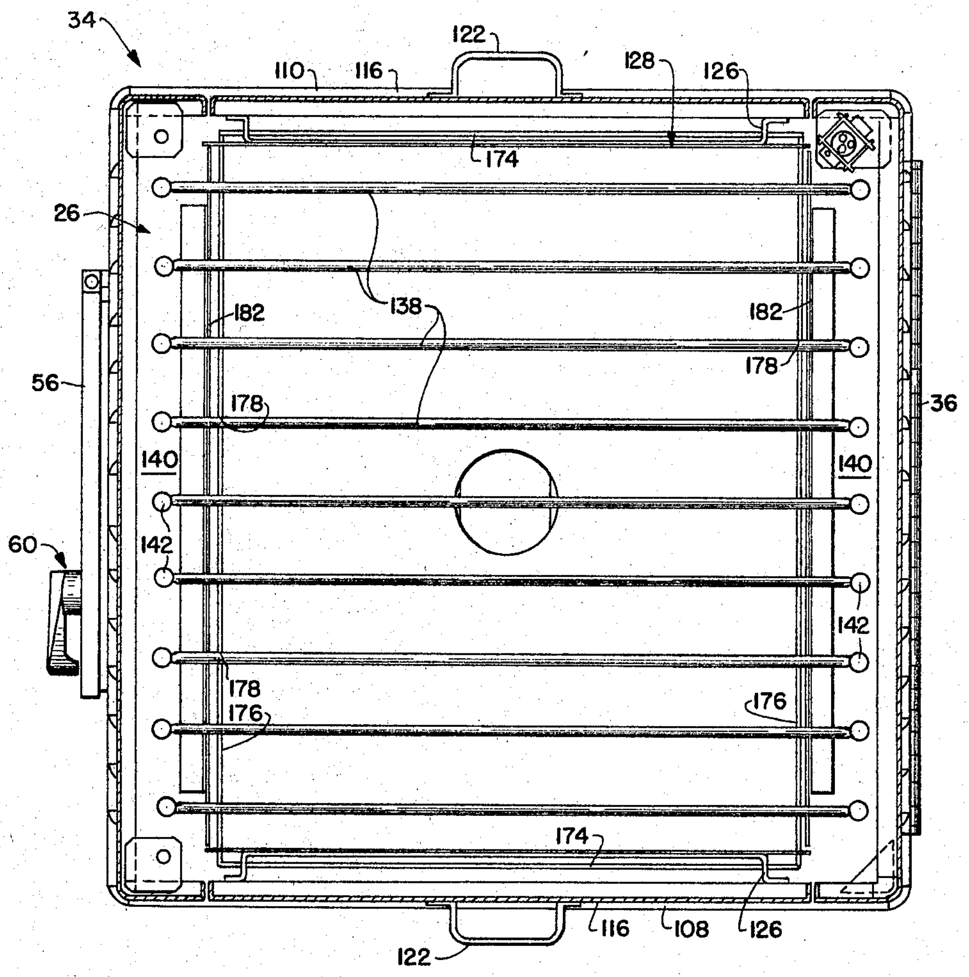
FIGURE 21 is a view of the type form heater similar to FIGURE 10, showing an alternate arrangement of quartz lamps employed to adapt the type form heater for use with larger type forms.

With reference now to FIGURES 10 and 21, another novel and important feature of the type form heater disclosed herein is that it may be employed to uniformly heat type forms of varying size. For smaller sizes of type forms the six lamp arrangement shown in FIGURE 10 is employed; and, for larger type forms, the nine lamp array of FIGURE 21 is utilized. Type form heater 20 is so constructed that either the six or nine lamp array can be installed in radiant heating unit 26 without modification of the type form heater. This is accomplished by providing mounting apertures in lamp supporting members 140 for terminal clip assemblies 142 at the locations shown in FIGURE 21 as well as those shown in FIGURE 10 and by providing dual sets of slots through the front and rear reflectors 176 of reflector assembly 146. Thus, either a six or nine lamp array can be provided by locating terminal assemblies 142 in the appropriate apertures and by employing a suitable arrangement of bus bars in bus bar assembly 144 to properly connect the selected number of lamps to the source of operating voltage.

As shown in both FIGURES 10 and 21, the distance between adjacent lamps 138 is substantially greater than the distance between the outermost lamps and the adjacent side reflectors 174. This is another important feature of the present invention in that it has been found that, by employing this particular relationship, a substantially uniform distribution of radiant energy over the entire surface of the type form being heated can be provided.

Figures 22, 23, 24:
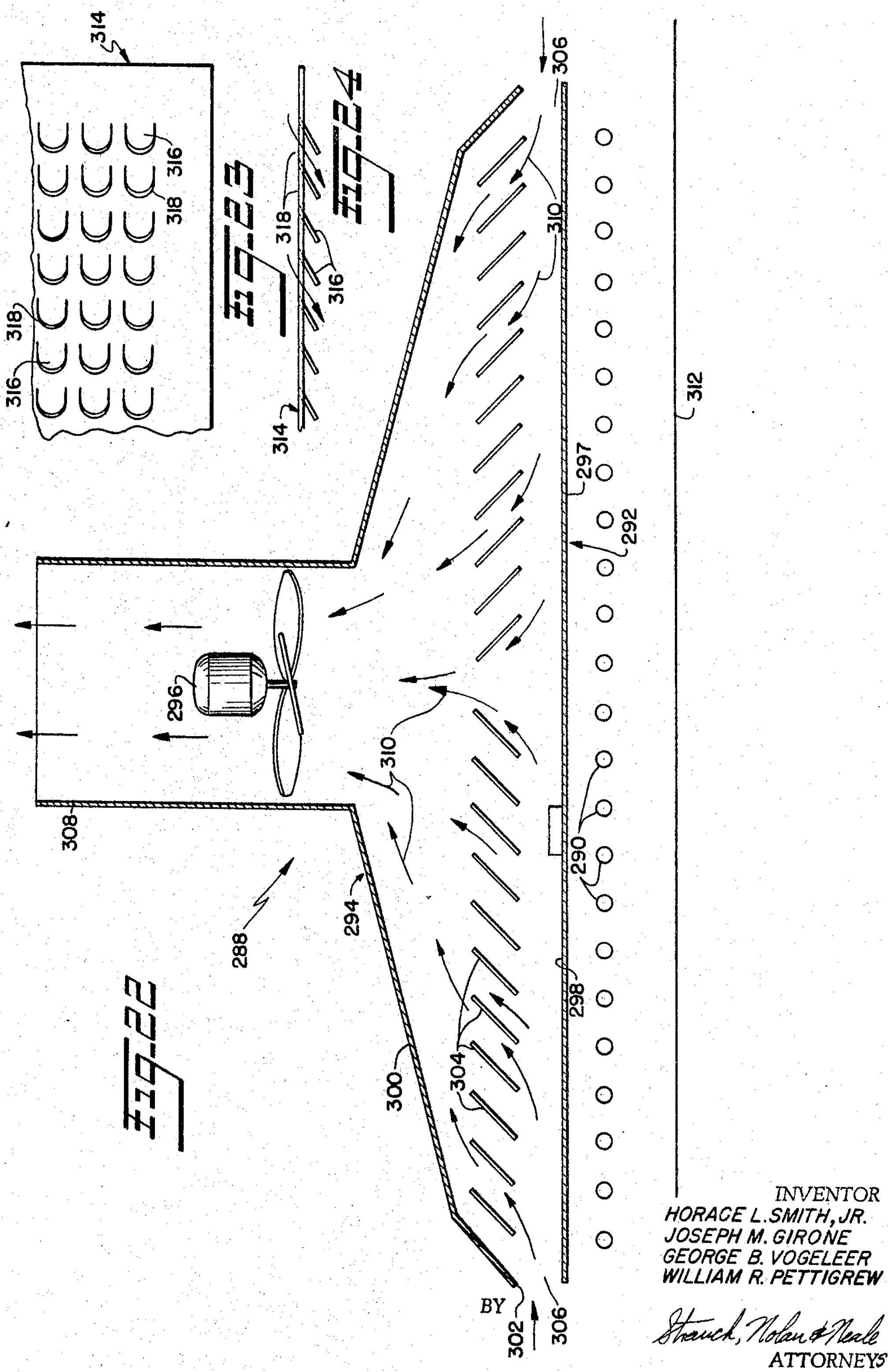
FIGURE 22 is a generally diagrammatic section through a novel reflector cooling system which may be employed in the type form heater of FIGURE 1, but which is adapted to be used in any type of heating apparatus employing reflectors.
FIGURE 23 is a plan view of an alternate heat sink and flow directing member for the system of FIGURE 22.
FIGURE 24 is a side view of the heat sink-flow directing member.

Referring now to FIGURE 22, reference character 288 identifies an improved radiant heating and reflector cooling assembly which may be substituted for that described previously in applications of the present invention where maximum cooling of the lamp terminals and reflector is desired or necessary and which may be used in other types of heating apparatus employing infrared lamp heaters. Assembly 288, shown diagrammatically in FIGURE 22, includes infrared lamps 290, top reflector 292, and a cooling system 294 including an exhaust fan or blower 296.

Lamps 290 are of the type and may be supported in the manner described previously or in any other desired manner.

In this embodiment of the present invention, the lower side 297 of top reflector 292 is preferably gold plated to provide maximum reflectivity and minimum absorptivity of the radiant energy emitted from lamps 290 as in the reflector embodiment described previously. But, in this embodiment of the present invention, the upper or back side 298 of the reflector is coated with a highly emissive and absorptive substance such as the glass frit coatings described in copending application No. 323,848 filed November 14, 1963, for Heat Exchangers.

Because of the combination of highly reflective and highly emissive coatings on the opposite sides of reflector 292, the reflector will absorb very little of the energy emitted from lamps 290; and the energy that is absorbed will be efficiently reradiated at a high rate from the back or upper side 298 of the reflector.

The heat thus radiated from reflector 292 is removed by the cooling system 294. As shown in FIGURE 22, this arrangement includes a casing 300 with its lower edges 302 spaced above reflector 292, a series of inclined baffles 304 in casing 300, and exhaust fan 296, which is also housed in casing 300. Baffles 304 are preferably coated with the same highly absorptive materials as the upper side 298 of reflector 292. Thus, the heat radiated from reflector 292 is absorbed by baffles 304. This heat is removed from the baffles by fan induced circulation of air through the inlet opening 306 between reflector 292 and casing 300, across the baffles, and out the stack 308 provided by the upper portion of casing 300 as shown by arrows 310 (natural circulation may be employed instead of forced convection, but this is less efficient as will become apparent shortly).

The following examples illustrate the effectiveness of the arrangement just described in maintaining the reflector at an acceptably low temperature.

EXAMPLE I

In this example, the objects being heated (identified by reference character 312 in FIGURE 22) had a relatively high reflectivity of 0.65 and infrared lamps 290 had a heat flux density of 10 kw. per square foot, which is equal to 34,000 B.t.u. per square foot per hour. The front or lower side 297 of reflector 292 was gold plated and had a reflectivity of 0.95. The back or upper side 298 and baffles 304 were coated with a material having an emissivity of 0.95. With no circulation of air, reflector 292 reached a temperature of 800° F. With air circulated at the very low rate of 100 cubic feet per minute per square foot of reflector surface, 3,000 B.t.u. per square foot of reflector surface per hour were removed, reducing the reflector temperature to 470° F. In other words, by employing the arrangement illustrated in FIGURE 22 and a very low circulation of air, the temperature of the reflector can be virtually halved in applications where the heated material has a high reflectivity.

EXAMPLE II

The conditions here were the same as in Example I except that the product being heated had a very low reflectivity of 0.10. In this case, 1,790 B.t.u. per square foot per hour were transmitted to the reflector and 32,210 B.t.u. per square foot per hour to the objects being heated. With no air circulation, the reflector reached a temperature of 560° F. With convection cooling at a rate of 100 cubic foot of air per square foot of reflector surface per minute, 1,390 B.t.u. per hour per square foot were removed by the circulating air and the reflector temperature dropped to 250° F., again halving the reflector temperature.

Numerous modifications may of course be made in the embodiment of the present invention illustrated in FIGURE 22, if desired. An exemplary modification is the substitution of the heat sink-air flow control 314 illustrated in FIGURES 23 and 24 for the louvers or baffles 304 of FIGURE 22. Air flow controller 314 is formed of sheet metal from which tabs 316 are punched at an angle. After the flow controller 314 is formed, it is coated with a highly emissive substance like baffles 304. This air flow controlling embodiment operates in substantially the same manner as baffles 304, the cooling air passing through the apertures 318 left by stamping out tabs 316 and then over the tabs, thereby removing absorbed heat from the latter.

Figure 25:
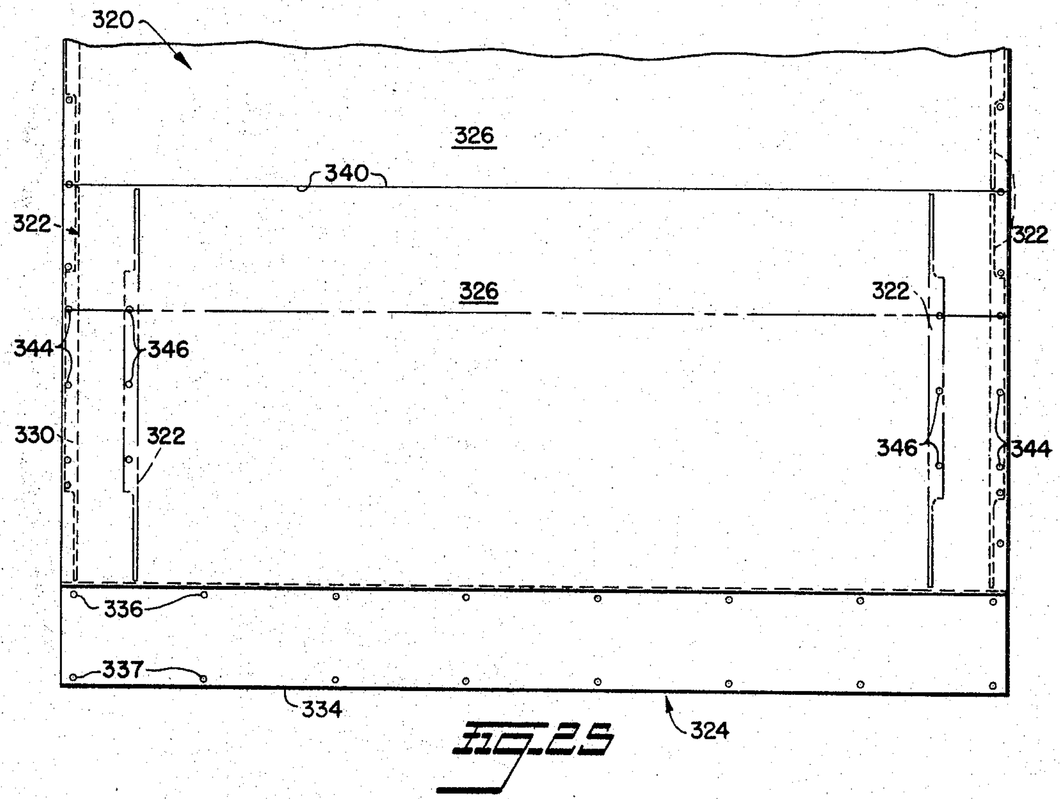
FIGURE 25 is a top view of an adjustable reflector assembly which may be employed in the type form heater of FIGURE 1 or in other forms of heating apparatus.
Figure 26:
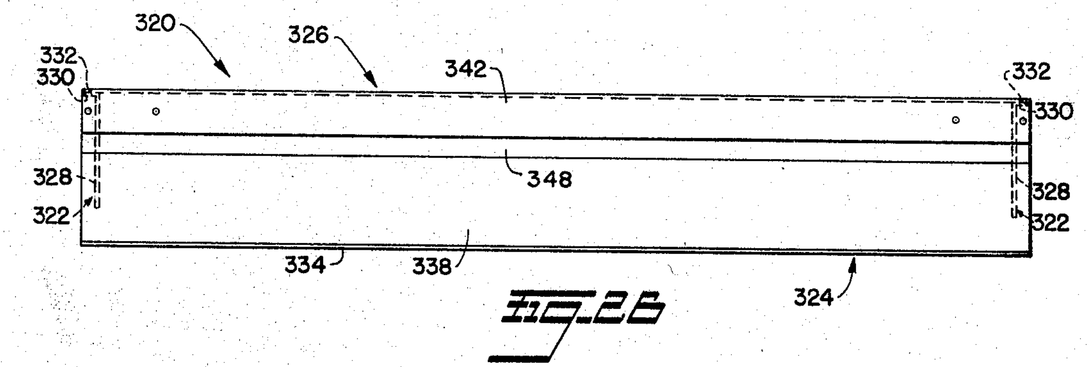
FIGURE 26 is a side view of the adjustable reflector assembly.
Figure 27:
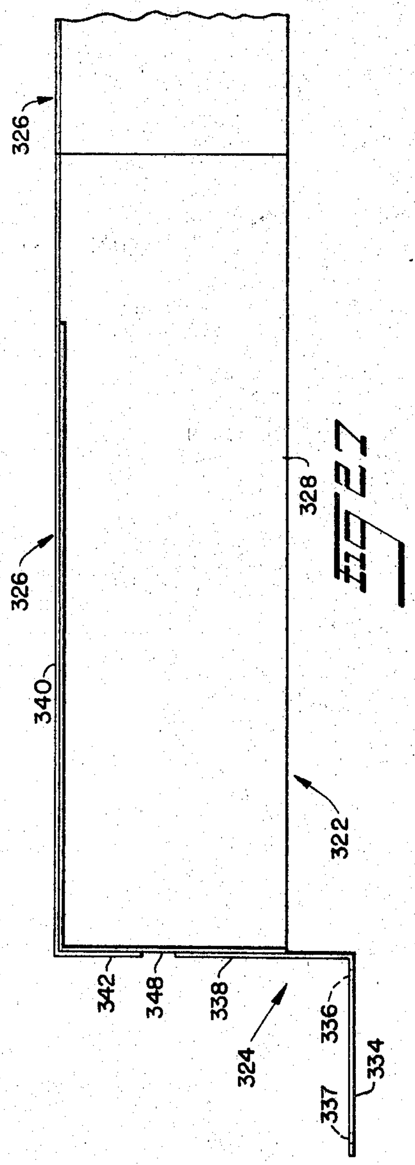
FIGURE 27 is an end view of the adjustable reflector assembly assembled to accommodate the larger of two sizes of type forms or other objects.

FIGURES 25–27 illustrate a reflector assembly 320 which can be substituted for the reflector assembly 146 described previously in type form heater 20 and which has the advantage over the latter that its size can be adjusted to match the size of radiant heating unit 26 and the object or objects being heated. By thus adjusting the reflector assembly, a maximum proportion of the emitted radiation is directed to the type form or other object or objects being heated. More flexibility in the spacing of the infrared lamps is also provided by reflector assembly 320, which is another important advantage.

As shown in the figures just mentioned, reflector assembly 320 includes four end reflectors 322, two side reflectors 324, and two top reflectors 326. End reflectors 322 are L-shaped, having a vertical reflecting leg 328 and a horizontal mounting flange 330 in which apertures 332 are formed. Side reflectors 324 are also L-shaped (see FIGURE 27). The side reflectors have horizontal legs 334 in which fastener receiving apertures 336 and 337 are formed and vertically extending reflector legs 338.

Top reflectors 326 are of the same L-shaped configuration as the side and end reflectors and have horizontal reflecting legs 340 and vertical reflecting legs 342. Two rows of fastener receiving apertures 344 and 346 are formed in each end portion of the two top reflectors.

End reflectors 322 are attached to top reflectors 326 by fasteners (not shown) extending through the apertures 332 in the side reflectors and either apertures 344 or apertures 346 in the top reflectors, two end reflectors 322 being fastened to each of the two top reflectors 326. With the fasteners inserted through apertures 344 in the top reflectors, end reflectors 322 lie in the positions shown in FIGURES 25 and 26; and, so positioned, can be disposed closely adjacent the outermost infrared lamps 138 in a nine lamp heating unit as shown in FIGURE 21. If the fasteners are inserted through apertures 346 of the top reflectors, end reflectors 322 are positioned as shown in phantom lines in FIGURE 25; and, thus positioned, lie adjacent the outermost lamps 138 of a narrower six lamp heating unit as shown in FIGURE 10. Thus, depending upon whether the fasteners are inserted in apertures 344 or 346 of the top reflector, the end reflectors can be readily adjusted to provide an even distribution of radiant energy from either a six or nine lamp heating unit (in conjunction with the foregoing it is to be understood that the manner in which the end reflectors are adjusted is applicable to other than six and nine lamp heating units).

The distance between the two side reflectors 324 can also be adjusted in reflector assembly 320. This is an important feature of the reflector assembly since it permits the type form heater to be readily adjusted for different sizes of type forms. Specifically, for wider type forms, the two top reflectors 326 are mounted as shown in FIGURE 27 with the free edges of their horizontal reflecting legs 340 in abutting relationship. For narrower type forms, the two top reflectors 326 are mounted as shown in FIGURE 28 with their top reflecting legs 340 and the reflecting legs 328 of end reflectors 322 overlapping.

Side reflectors 324 may be attached to any suitable structural portion of the type form (or other) heater (for example, the top wall 46 of the lower section 32). Mounting apertures 336 and 337 permit them to be positioned adjacent the top reflectors 326, regardless of whether the latter are positioned as shown in FIGURE 27 or as shown in FIGURE 28, the inner rows of fastener receiving apertures 336 being employed when the top reflectors are arranged as shown in FIGURE 27 and the outer row being utilized when the top reflectors are positioned as shown in FIGURE 28.

Figure 28:
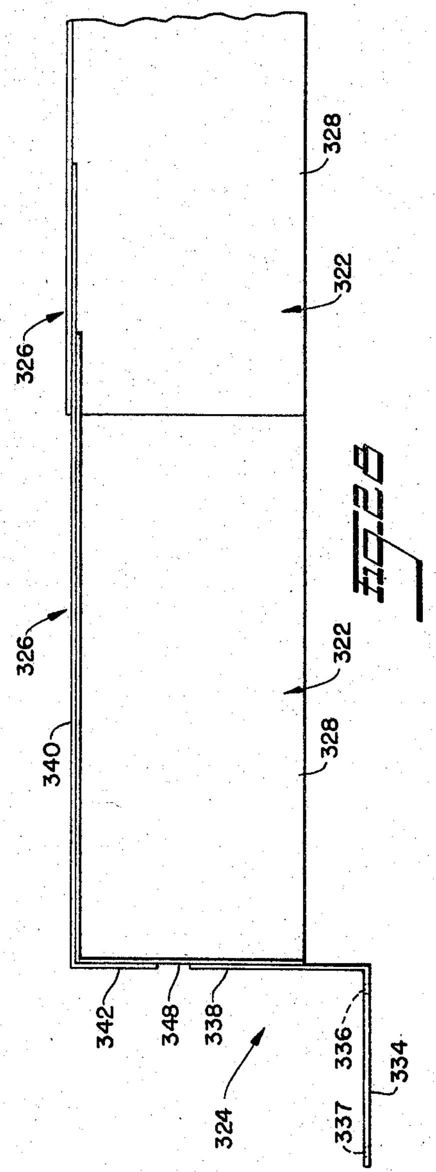
FIGURE 28 is an end view of the adjustable reflector assembly arranged to reflect heat on the smaller of the two sizes of type form or other objects.

As shown in FIGURES 26–28, there are slots 348, extending the length of the reflector assembly, between the vertical reflecting legs 342 of the top reflectors and the reflecting legs 338 of the side reflectors. The infrared lamps 138 extend through these slots instead of through apertures as in the reflector assembly 146 described previously. The use of a continuous slot instead of discrete apertures is an important practical feature as it provides greater flexibility of the spacing between the infrared lamps. And, even with the reflectors overlapped, the apertures 344 and 346 in the top reflector are aligned, so that the connection of the end reflectors to the top reflectors may be effected in the manner previously described.

As in reflector assembly 146, the inner surfaces of the reflecting members of reflector assembly 320 are preferably gold plated to maximize the proportion of emitted radiation directed onto the object or objects to be heated and to minimize the absorption of heat by the components of the reflector assembly.

Other modifications of this embodiment of the present invention will readily occur to those skilled in the arts to which this invention pertains; and such modifications are intended to be covered by the appended claims except as expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A heater for type forms and the like, comprising:

(a) a cabinet;

(b) a radiant heating unit in said cabinet;

(c) a tray positionable in said cabinet below the radiant heating unit in a general horizontal orientation for exposure to the radiant energy emanating from said radiant heating unit;

(d) means mounting said tray for movement into and out of said cabinet;

(e) control means for the radiant heating unit in said cabinet, said control means including a circuit incorporating normally closed temperature responsive switch means having a temperature sensitive actuator adapted to open the switch contacts when an object in contact with said actuator reaches a preselected temperature;

(f) a lifting plate carried by said tray, means locating said lifting plate laterally relative to said tray, and spring means biasing said lifting plate downward relative to said tray, said switch means being carried by said lifting plate; and (g) positioning means located in the path traversed by the lifting plate during inward movement of said tray for automatically elevating said lifting plate and the switch means carried thereby relative to said tray coincident to the inward movement of said tray to thereby move the temperature sensitive actuator of said switch means into contact with an object on said tray, whereby said actuator will open said switch means and interrupt the circuit to said radiant heating unit when the tray supported object reaches a predetermined temperature, (h) said switch position means comprising cam means fixed relative to said cabinet and adapted to be engaged by said lifting plate as said tray is moved to the closed position, said cam means being configured to move said lifting plate upward relative to said tray against the force of said biasing means a distance sufficient to bring said temperature sensitive actuator into contact with the tray-supported object as said tray is closed and to retain said switch means in said elevated position until said tray is subsequently moved to its open position.

2. The heater of claim 1, wherein said control means circuit incorporates a plurality of normally closed temperature responsive switch means each having a temperature sensitive actuator adapted to engage the object on said tray and adapted to open the switch contacts when said object reaches a preselected temperature, said switch means all being carried by and elevated with said lifting plate by said switch positioning means as aforesaid and being relatively located such that the actuators of said switch means will contact different areas of the object on the tray to insure that at least one of said actuators is in contact with said object even though there are irregularities in said object, and said switch means being wired in series, whereby said switch means insure accurate control of the temperature to which the tray supported object is heated.

3. The heater of claim 1, wherein:

(a) said cabinet has a base section and a top section and said radiant heating unit is mounted in said top section; and (b) said control means includes normally closed safety switch means opened coincident to opening movement of said top section to prevent operation of said radiant heating unit unless said top section is closed, said safety switch means being housed in the base section of said cabinet.

4. The heater of claim 1:

(a) wherein the radiant heating unit includes a generally horizontal planar array of infrared radiation emitting lamps; and (b) said heater further comprises:

(c) a reflector above said lamps;

(d) apertures through side walls of said cabinet at about the level of said array of lamps; and (e) an exhaust fan in said cabinet above said reflector having an outlet communicating with the exterior thereof for drawing air through said apertures and across said reflector to protect said reflector against overheating.

5. The heater of claim 4, wherein the control means for the radiant heating unit further comprises:

(a) means including a circuit breaker for connecting said exhaust fan and the circuit in which the temperature responsive switch means is incorporated to a source of operating voltage;

(b) a relay energizable to complete said circuit; and (c) manually operable switch means for simultaneously energizing said relay to complete said circuit and connect said fan across the source of operating voltage to thereby effect simultaneous operation of said fan and said infrared lamps.

6. The heater of claim 4, together with means for removing heat from said reflector including means having a low absorptivity on the side of the reflector facing the radiant heater for minimizing the transmission of heat to the reflector and means on the opposite side of the reflector having a high coefficient of emissivity for maximizing the dissipation of absorbed heat from said reflector.

7. The heater of claim 6, wherein the low absorptivity and high emissivity means on the opposite sides of the reflector comprise, respectively, a coating of a material having a high coefficient of reflectivity and a low coefficient of absorptivity on the side of the reflector facing the radiant heater and a coating of a material having a high coefficient of emissivity on the opposite side of said reflector.

8. The heater of claim 6, together with means providing a heat sink on the side of the reflector opposite the radiant heater.

9. The heater of claim 8, wherein the means providing the heat sink comprises a plurality of baffles coated with absorptive material.

10. The heater of claim 8, wherein said heat sink means comprises an apertured sheet having flow directing tabs extending therefrom and a coating of a material having a high coefficient of absorptivity thereon.

11. The heater of claim 6, together with a plurality of baffles on the side of the reflector opposite the radiant heater, said baffles being angularly inclined relative to the reflector; and means for removing from said baffles heat radiated thereto from the reflector comprising a casing surrounding said baffles and having peripheral edge portions spaced from said reflector to provide air inlet openings adjacent the reflector, said exhaust fan having an inlet and an outlet communicating respectively with the interior and the exterior of said casing, whereby said exhaust fan will draw air through said inlets and across said baffles to remove therefrom the heat absorbed by said baffles.

12. The heater of claim 4:

(a) wherein said lamps each include a sealed tube, conductive end caps on the ends of said tube, a resistance element in said tube, pigtail terminals connected to the resistance element and extending through the ends of said tube to its exterior, said pigtail terminals being connected to said end caps; and (b) said radiant heating unit further includes terminal clip assemblies each including a single component for connecting said end caps to a source of electrical power and for mechanically supporting said lamps in the top section of said cabinet.

13. The heater of claim 12, wherein said clip assemblies each include a clip member having generally parallel, spaced apart legs of resilient material adapted to engage the opposite sides of each of said end caps and thereby support the associated lamp and connect its resistance element to a source of operating voltage.

14. The heater of claim 1, together with locking means for automatically retaining said tray in the position of maximum displacement out of said cabinet.

15. The heater of claim 1, together with electrical conductor means fixed at one end to the switch means carried by said lifting plate, and biasing means connected between said cabinet and said conductor means for automatically retracting the latter as said tray is moved relative to said cabinet.

16. The heater of claim 1, wherein said tray mounting means comprises:

(a) a horizontal support member in said cabinet;

(b) parallel, spaced apart rows of rolling element supporting components mounted on said support member; and (c) guide rails fixed to the bottom of said tray and adapted to engage the rolling elements of said supporting components.

17. The heater of claim 1, together with vertically adjustable heater supports at the four corners of the cabinet.

References Cited by the Examiner

UNITED STATES PATENTS

| | | | |
|---|---|---|---|
| 1,581,429 | 4/1926 | Donle | 219—494 |
| 1,777,482 | 10/1930 | Chormann | 219—358 |
| 2,012,335 | 8/1935 | Bergen | 219—541 |
| 2,095,502 | 10/1937 | Johnston | 34—4 X |
| 2,387,349 | 10/1945 | Powers. | |
| 2,455,654 | 12/1948 | Browne | 236—69 |
| 2,651,702 | 9/1953 | Burke et al. | 219—348 X |
| 2,806,123 | 9/1957 | Steinback | 219—312 |
| 2,807,703 | 9/1957 | Roshon | 219—358 |
| 2,896,060 | 7/1959 | Serfass et al. | 219—541 |
| 2,935,594 | 5/1960 | Christenson | 219—398 |
| 2,981,819 | 5/1961 | Gregory | 219—405 |
| 3,008,029 | 11/1961 | Davis et al. | 219—343 |
| 3,014,774 | 12/1961 | Grib et al. | 312—341 |
| 3,017,227 | 1/1962 | Thornton. | |
| 3,038,987 | 6/1962 | Dow et al. | 219—343 |
| 3,052,037 | 9/1962 | Miskelle | 219—354 X |
| 3,059,086 | 10/1962 | Pedersen | 219—354 X |
| 3,193,663 | 7/1965 | Budzich et al. | 219—405 |

ANTHONY BARTIS, *Acting Primary Examiner.*